United States Patent [19]

Cushman et al.

[11] 3,891,620

[45] June 24, 1975

[54] MODIFIED NATURAL GUMS

[75] Inventors: Donald R. Cushman, Wenonah; John W. Schick, Cherry Hill, both of N.J.

[73] Assignee: Mobil Oil Corporation, New York, N.Y.

[22] Filed: Jan. 4, 1974

[21] Appl. No.: 430,970

[52] U.S. Cl. ............. 260/209.6; 106/170; 106/213; 106/238; 260/209; 424/363
[51] Int. Cl. ...................... C08b 19/00; C08b 19/10
[58] Field of Search ......... 260/209.6; 106/170, 213, 106/238

[56] References Cited
UNITED STATES PATENTS

| | | | |
|---|---|---|---|
| 1,280,862 | 10/1918 | Satow | 260/209.6 |
| 2,471,714 | 5/1949 | Barthel et al. | 106/218 |
| 2,832,692 | 4/1958 | Gorham et al. | 106/238 |
| 3,300,473 | 1/1967 | Christoffel et al. | 260/209.6 |
| 3,468,686 | 9/1969 | Schultz | 106/238 |
| 3,598,622 | 8/1971 | Maher et al. | 106/213 |

OTHER PUBLICATIONS

Alexander, Colloid Chemistry Theoretical and Applied, Volume VI, Reinhold Publishing Corp., N.Y., N.Y., 1946, pp. 250, 255, 256, 523, 674–676, & 689–695.

*Primary Examiner*—Ronald W. Griffin
*Attorney, Agent, or Firm*—Charles A. Huggett; Raymond W. Barclay; Benjamin I. Kaufman

[57] ABSTRACT

A process is provided for preparing modified natural gum emulsifying agents and their use, for such purpose, in oil-in-water emulsions.

11 Claims, No Drawings

MODIFIED NATURAL GUMS

BACKGROUND OF THE INVENTION

1. Field of the Invention

This invention relates to natural gums, and more particularly, to the preparation of modified natural gums. Still more particularly, in one of its aspects, the invention relates to the preparation of modified natural gums and their use, as emulsifying agents, in oil-in-water emulsions.

2. Description of the Prior Art

Prior to the present invention, naturally occurring gums have been employed as emulsifying agents, particularly in oil-in-water type emulsions. Thus for example, gum ghatti, a naturally occurring gum, is extracted from vegetation, particularly indigenous to India and Ceylon, and has been a mainstay emulsifying agent in the pharmaceutical and food industries. In addition, for many years, gum ghatti has been an excellent emulsifier in acid-stable wax emulsions, because of its availability and outstanding emulsifying effectiveness. Similarly, other naturally occurring gums have also been effectively employed for such purposes, for example gum arabic, gum tragacanth, algins, and the like. It is found, however, that these gums although effective as emulsifying or thickening agents, are costly, and also result in an unstable emulsion having too high a viscosity. If such gums could be successfully modified, to result in overall lower cost and the same, or improved degree of effectiveness, as in their naturally occurring state, they would represent attractive emulsifying agents, particularly in such media as oil-in-water emulsions.

SUMMARY OF THE INVENTION

It has now been found that natural gums of molecular weights equal to or higher than that of gum ghatti, can be employed as emulsifying agents in acid-stable wax emulsions and oil-in-water emulsions, particularly, at reduced cost. In general, in accordance with the present invention, a process is provided for preparing modified natural gums, suitable for use as emulsifying agents, in such media as oil-in-water emulsions, by subjecting these natural gums to hydrolysis, to produce improved emulsifying agents. More particularly, these naturally occurring gums, although otherwise effective as emulsifying agents, but not attractive because of their relatively high viscosity, resulting in unstable emulsions, can be improved by means of acid, alkaline or enzyme hydrolysis to improve their emulsive qualities. By way of illustration gum arabic, for example, derived from the acacia tree, though considered an alternate substitute for gum ghatti, in many industrial applications, represents only a fair emulsifying agent, imparting only marginal emulsion stability. However, upon hydrolysis, gum arabic closely approximates the outstanding emulsive capabilities of gum ghatti. Thus, in accordance with the present invention, wax emulsions of low viscosity and good shear properties can be formulated from hydrolyzed gum arabic or other hydrolyzed natural gums, which are complex polysaccharides prior to hydrolysis. These gums are hydrolyzed to simpler structures of lower molecular weight, and water solutions of the hydrolyzed products exhibit lower viscosities and improved emulsive properties. In this respect, naturally occurring gum ghatti, itself, can also be hydrolyzed for effectively improved properties, if so desired.

In accordance with the present invention, as more fully hereinafter described, many natural gums can be modified by subjecting the natural gums to hydrolysis in the presence of a hydrolyzing agent at a temperature from about 80°F. to about 212°F. and, preferably, at a temperature from about 160°F. to about 212°F. Exemplary of the natural gums that can be modified are gum ghatti, gum arabic, gum tragacanth, alginic acid and waxy maize.

Any hydrolyzing agent capable of modifying the natural gum can be employed and may include inorganic acids, e.g., hydrochloric acid, sulfuric acid, phosphoric acid and other mineral acids. Alkali metal hydroxides may also be employed as the hydrolyzing agent, e.g., sodium hydroxide, potassium hydroxide and lithium hydroxide.

The hydrolyzing agent may also comprise an enzyme, e.g., invertase, amylase, amyloglucosidase, maltase, pectinase, amylophosphatase, and enzyme producing agents such as fungi, molds and bacteria.

In carrying out the hydrolysis, the hydrolyzing agent is employed in an amount sufficient to achieve the desired degree of modifying the characteristics of the natural gum. In general, in many applications, the hydrolyzing agent is employed in an amount from about 0.1 to about 2 percent, and preferably in an amount from about 0.5 to about 1.5 percent, by weight, of water present during hydrolysis.

In preparing the oil-in-water emulsion, the modified natural gum emulsifying agent can be employed in any amount sufficient to yield the desired degree of oil dispersed in the water phase. In general, in many applications, the modified natural gum emulsifying agent is effectively employed in an amount from about 0.2 to about 5 percent, and preferably from about 0.5 to about 2 percent, by weight, of the total weight of the emulsion.

Basically, the natural gums belong to a class of polysaccharides (sugars) having a complex group of monosaccharide molecules arranged in different configurations and repeated sequences. Glucuronic acid (glucose molecule containing a carboxylic acid group) appears as a common denominator in many gums. The differences in gums occur with the remaining structure and ultimately with molecular size (molecular weight). It is theorized that the concentration of uronic acid in the gum structure and its molecular weight are the major contributing factors to emulsive effectiveness. It is also theorized that gums with higher molecular weights and less uronic acid are the cause of high viscosities in wax emulsions and their marginal stability. Thus, it is found that gum ghatti, for example, is about 1/16 the molecular weight of gum arabic, its nearest rival. In this respect we have found that as the mole weight increases, thick, pasty emulsions result which easily separate into two phases after prolonged standing. It is also known that, as part of structure identification study, it is possible to potentially decompose polysaccharides into lower molecular weight compositions by mild acid hydrolysis. It is thus found that destructive hydrolysis of gum arabic and similar gums by mild acid can produce intermediates which closely approximate that of gum ghatti in performance. Furthermore, it is found that in the hydrolysis step acid concentration, acid type, reaction time, gum type and pH have some bearing on the performance character of the gum intermediate.

Hydrolysis is found to be dependent on time and acid concentration at about 200°F. For example, as hereinafter disclosed, at two practical acid levels examined, viz., 1.0 and 0.5 percent, by weight, of gum solution, the 1.0 percent acid concentration and a 30 minute hydrolysis time, resulted in low viscosity wax emulsions with good shear stability. Shorter hydrolysis time (15 minutes) appears to result in degradation of shear stability, whereas a longer hydrolysis time exhibits no particular advantage over an optimum 30 minute period.

It is also found that when an acid hydrolyzed gum solution is directly employed in the emulsion making process, the pH is about 1. Normally, such level of acid is not desirable in many emulsions because of its highly corrosive activity. In general, the more desirable gum type stabilized emulsions possess a pH of about 4 to about 5. Studies of pH adjustment of the finished emulsion have indicated that as the pH approaches 7, the viscosity increases with little or no change in shear stability. However, at neutrality the wax emulsion tends to turn pasty.

DESCRIPTION OF SPECIFIC EMBODIMENTS

The following examples and comparative data will serve to illustrate the novel modified natural gum emulsifying agents of the present invention, the method for their preparation and their use as emulsifying agents in oil-in-water emulsions. As, in hydrolysis reactions known to those skilled in the art, there is involved a double decomposition that depends upon the presence of the ions formed from water.

As is shown in the following Table I, the typical inorganic acids employed for experimental purposes comprised hydrochloric, sulfuric and phosphoric acids. The shear stability test employed for evaluating the specific wax emulsions consisted of placing the oil-in-water wax emulsion in a metal cup with a tetrafluoroethylene disc in the bottom. A drill press spins a slotted metal rotor against the liner under load. The amount of wax sheared out of the emulsion is weighed and recorded in grams. In these examples 75 grams of wax emulsion were employed; 25 lbs. pressure was employed, with the cup resting on a spring-loaded platform. The rotor speed was 2000 rpm and the time of rotation was 5 minutes. After the machine was turned off, the emulsion was poured onto a 100 mesh screen. Loose particles of wax from the rotor or cup were also transferred to the screen. The screen was then thoroughly rinsed with water, then with acetone, then dried to constant weight in a forced-draft oven. The weight of the sheared-out wax was reported in grams, to the nearest 0.01 gram.

Table I

Gum Arabic Hydrolysis Conditions - Effect on Emulsion Properties[a]

| Example | Acid | Conc. % Wt. | Hydrolysis[b] Time, Min. | Emulsion Properties Viscosity Cp. | Shear Stability |
|---|---|---|---|---|---|
| 1 | HCl | 1 | 120 | 70 | 2.16 |
| 2 | | 1 | 30 | 50 | 1.61 |
| 3 | | 1 | 15 | 125 | 3.73 |
| 4 | | 0.5 | 30 | 190 | 2.08 |
| 5 | $H_2SO_4$ | 1 | 30 | 515 | 3.02 |
| 6 | $H_3PO_4$ | 1 | 30 | 1475 | 1.99 |
| 7 | None | — | — | 900 | 3.24 |

[a]1% Wt. gum used as emulsifying agent.
[b]Acidified gum solution was simmered at 200–210°F. for specified time.

As will be seen from the comparative data of the examples of Table I, hydrochloric acid appeared to be most effective as determined by the viscosity measurement of the finished emulsion. With regard to acid concentration hydrolysis was shown to be dependent on time, as hereinbefore indicated, at about 200°F. Furthermore, the two practical acid levels examined, viz., 1.0 percent and 0.5 percent, the 1.0 percent acid concentration, in conjunction with a 30 minute hydrolysis time, resulted in a low viscosity wax emulsion with good shear stability. Shorter hydrolysis time (15 minutes) is shown to degrade shear stability, whereas a longer hydrolysis time exhibited no particular advantage over an optimum 30 minute period. The specific oil-in-water emulsion employed comprised:

| | Wt. % |
|---|---|
| Paraffin wax | 41.6 |
| Microcrystalline wax | 4.9 |
| Gum Arabic (emulsifier) | 1.5 |
| Condensed naphthalene sulfonate (stabilizer) | 3.0 |
| Sodium pentachlorophenate (biocide) | 0.1 |
| Formalin (biocide) | 0.1 |
| Water | 48.8 |

In the following Table II are disclosed the comparative effects of untreated and acid-hydrolyzed gums in the preparation of the aforedescribed oil-in-water emulsion. From the comparative data of the Table it will be noted that acid hydrolysis lowers emulsion viscosity and improves its shear stability. Based on the comparative data, for example, for gum ghatti and gum arabic, it can be concluded that acid hydrolysis of gum arabic exhibits greatly improved emulsion viscosity and shear stability.

Table II

Acid Hydrolysis of Natural Gums - Effectiveness as Wax Emulsifiers

| Example | Gums | Untreated Wt. % | Treated[a] Wt. % | Appearance | Emulsion Properties Viscosity cp. | Shear Stability(g.) |
|---|---|---|---|---|---|---|
| 1 | Ghatti | 1.0 | | Fluid | 1600–2200 | 2.40–2.70 |
| 2 | " | | 1.0 | " | 250 | 3.05 |
| 3 | " | | 2.0 | " | 1070 | 2.23 |
| 4 | Arabic | 1.0 | | " | 900 | 3.24 |
| 5 | " | | 1.0 | " | 30 | 1.77 |
| 6 | " | | 1.5 | " | 90 | 1.25 |
| 7 | Tragacanth | 1.5 | | Solid | — | — |
| 8 | " | | 1.5 | Visc. Fluid | — | — |
| 9 | Alginic Acid | | 1.5 | Fluid | 650 | 1.55 |
| 10 | Waxy Maize | | 1.5 | " | 690 | 1.32 |

[a]Acid hydrolyzed with 1% hydrochloric acid for 30 minutes prior to emulsifying wax-water mixture.

In a manner similar to the above-described embodiments, alkali metal hydroxides and enzyme hydrolyzing agents can be effectively employed in modifying natural gums to obtain emulsifying agents particularly adapted for preparing improved oil-in-water emulsions. In the following Table III are shown the comparative effects of untreated and alkali metal hydroxide hydrolyzed gums in the preparation of 2000 gram batches of oil-in-water emulsions.

Table III

Potassium Hydroxide Hydrolysis of Gum Arabic-
Effect on Emulsion Properties

| Oil-in-Water Emulsion | Emulsion A (Wt. %) | Emulsion B (Wt. %) |
|---|---|---|
| 133/135 AMP Paraffin Wax | 41.6 | 41.6 |
| Microcrystalline Wax | 4.9 | 4.9 |
| Gum Arabic (emulsifier) | 1.5 | 1.5 |
| Condensed Naphthalene Sulfonate (Stabilizer) | 3.0 | 3.0 |
| Sodium Pentachlorophenate (Biocide) | 0.1 | 0.1 |
| Formalin (Biocide) | 0.1 | 0.1 |
| Water | 48.8 | 48.8 |
| Hydrolysis | | |
| $H_2O$ (g.) | 500 | |
| Gum Arabic (g.) | 30 | |
| KOH (g.) | 1.0 | No Hydrolysis |
| Temp. °F. | 180 | |
| Time, min. | 30 | |
| Viscosity cp. | 185 | 2,995 |
| Shear Stability (g.) | 1.98 | 3.93 |

From the comparative data of the foregoing Table it will be noted that alkali metal hydrolysis lowers emulsion viscosity and improves shear stability. In a similar manner, improved oil-in-water emulsions can also be prepared employing natural gums modified with enzyme hydrolyzing agents, if so desired.

Although the present invention has been described with preferred embodiments, it will be understood that various modifications and adaptations thereof may be resorted to without departing from the spirit and scope of the invention, as those skilled in the art readily understand.

We claim:

1. A process for preparing a modified natural gum which comprises subjecting a natural gum to hydrolysis in the presence of a hydrolyzing agent selected from the group consisting of inorganic acids, alkali metal hydroxides and enzymes in an amount from about 0.1 to about 2 percent, by weight of water present during hydrolysis and at a temperature from about 80°F. to about 212°F.

2. A process as defined in claim 1 wherein said hydrolysis is carried out at a temperature from about 160°F. to about 212°F.

3. A process as defined in claim 1 wherein the natural gum is waxy maize.

4. A process as defined in claim 1 wherein the natural gum is gum arabic.

5. A process as defined in claim 1 wherein the natural gum is gum tragacanth.

6. A process as defined in claim 1 wherein the natural gum is alginic acid.

7. A process as defined in claim 1 wherein the natural gum is gum ghatti.

8. A process as defined in claim 1 wherein the hydrolyzing agent is hydrochloric acid.

9. A process as defined in claim 1 wherein the hydrolyzing agent is sulfuric acid.

10. A process as defined in claim 1 wherein the hydrolyzing agent is phosphoric acid.

11. A process as defined in claim 1 wherein the hydrolyzing agent is employed in an amount of from about 0.5 to about 1.5 percent, by weight, of water present during hydrolysis.

* * * * *